United States Patent
Heimerdinger et al.

(10) Patent No.: US 8,191,139 B2
(45) Date of Patent: May 29, 2012

(54) INTRUSION DETECTION REPORT CORRELATOR AND ANALYZER

(75) Inventors: Walter L. Heimerdinger, Minneapolis, MN (US); Jon P. Schewe, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 1025 days.

(21) Appl. No.: 11/017,382

(22) Filed: Dec. 20, 2004

(65) Prior Publication Data

US 2006/0070128 A1 Mar. 30, 2006

Related U.S. Application Data

(60) Provisional application No. 60/530,803, filed on Dec. 18, 2003.

(51) Int. Cl.
*H04L 29/06* (2006.01)
(52) U.S. Cl. .................. 726/23; 726/22; 726/24; 726/25
(58) Field of Classification Search .................. 726/23
See application file for complete search history.

(56) References Cited

U.S. PATENT DOCUMENTS

| | | | |
|---|---|---|---|
| 5,568,471 A * | 10/1996 | Hershey et al. ............... 370/245 |
| 5,626,140 A | 5/1997 | Feldman et al. |
| 6,256,773 B1 * | 7/2001 | Bowman-Amuah .......... 717/121 |
| 6,353,385 B1 * | 3/2002 | Molini et al. ................. 340/506 |
| 6,415,276 B1 | 7/2002 | Heger et al. |
| 7,409,593 B2 * | 8/2008 | Aaron ............................. 714/26 |
| 7,917,393 B2 * | 3/2011 | Valdes et al. .................... 726/23 |
| 2003/0093514 A1 * | 5/2003 | Valdes et al. ................... 709/224 |
| 2004/0111531 A1 * | 6/2004 | Staniford et al. ............. 709/246 |

* cited by examiner

*Primary Examiner* — Beemnet Dada
*Assistant Examiner* — Randal Moran
(74) *Attorney, Agent, or Firm* — Fogg & Powers LLC

(57) ABSTRACT

A computer/computer network security alert management system aggregates information from multiple intrusion detectors. Utilizing reports from multiple intrusion detectors reduces the high false alarm rate experienced by individual detectors while also improving detection of coordinated attacks involving a series of seemingly harmless operations. An internal representation of a protected enclave is utilized, and intrusion detection system (IDS) information is correlated to accurately prioritize alerts. In one embodiment, the system is capable of utilizing data from most existing IDS products, with flexibility to add further IDS products.

25 Claims, 7 Drawing Sheets

FIG. 4

| Event | Report |

Report: DOS-SYNDROP
Start Time:   2003-12-26 07:08:30
End Time:     2003-12-26 07:08:30
Duration:     0 seconds
Report Time:  2003-12-26 07:08:30
From IDS:     dragon@teapot:eth1
Anom:
Conf:         0
Status:
Complete:     0
Report ID:    10546850
Details:      [Vulnerability]   [Packet]   [Rule]
Notes:
Related Files:

FIG. 5

INTRUSION DETECTION REPORT CORRELATOR AND ANALYZER

RELATED APPLICATION

This application claims priority to U.S. Provisional Application Ser. No. 60/530,803 (entitled Intrusion Detection Report Correlator and Analyzer, filed Dec. 18, 2003) which is incorporated herein by reference.

GOVERNMENT FUNDING

The invention described herein was made with U.S. Government support under Contract No. F30602-99-C-0177 awarded by Defense Advance Research Projects Agency (DARPA) Advanced Technology Office and the Air Force Research Laboratory. The United States Government may have certain rights in the invention.

FIELD OF THE INVENTION

The present invention relates to computer and computer network intrusion detection, and in particular to an intrusion detection report correlator and analyzer.

BACKGROUND OF THE INVENTION

Network security requirements place heavy demands on system administrators in addition to the time required for systems operation, maintenance, and upgrades. The effort necessary to provide enclave security includes lengthy review of system logs and response to alerts, many of which are false alarms. This often results in genuine attacks being overlooked until the damage has been done. Strong intrusion detection and response mechanisms should reduce false alarm rates to increase system administrator productivity. A broader range of detected intrusions would strengthen the security posture. More timely intrusion detection would permit immediate response.

SUMMARY OF THE INVENTION

A security alert management system aggregates information from multiple intrusion detectors. Utilizing reports from multiple intrusion detectors reduces the high false alarm rate experienced by individual detectors while also improving detection of coordinated attacks involving a series of seemingly harmless operations. An internal representation of a protected enclave is utilized, and intrusion detection system (IDS) reports are correlated to accurately prioritize alerts. This approach permits system administrators to concentrate on important events while the security management system retains the vast quantities of data required for forensic purposes. In one embodiment, the system is capable of utilizing data from most existing IDS products, with flexibility to add further IDS products.

BRIEF DESCRIPTION OF THE DRAWINGS

FIG. 4 is a screen shot of a main analysis window of an example graphical user interface for the system of FIG. 1.

FIG. 5 is a screen shot of an intrusion report details provided by an example graphical user interface for the system of FIG. 1.

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

The functions or algorithms described herein are implemented in software or a combination of software and human implemented procedures in one embodiment. The software comprises computer executable instructions stored on computer readable media such as memory or other type of storage devices. The term "computer readable media" is also used to represent carrier waves on which the software is transmitted. Further, such functions correspond to modules, which are software, hardware, firmware or any combination thereof. Multiple functions are performed in one or more modules as desired, and the embodiments described are merely examples. The software is executed on a digital signal processor, ASIC, microprocessor, or other type of processor operating on a computer system, such as a personal computer, server or other computer system.

In the example embodiments, methods described may be performed serially, or in parallel, using multiple processors or a single processor organized as two or more virtual machines or sub-processors. Moreover, still other embodiments implement the methods as two or more specific interconnected hardware modules with related control and data signals communicated between and through the modules, or as portions of an application-specific integrated circuit. Thus, the exemplary process flow is applicable to software, firmware, and hardware implementations.

Figure 1:
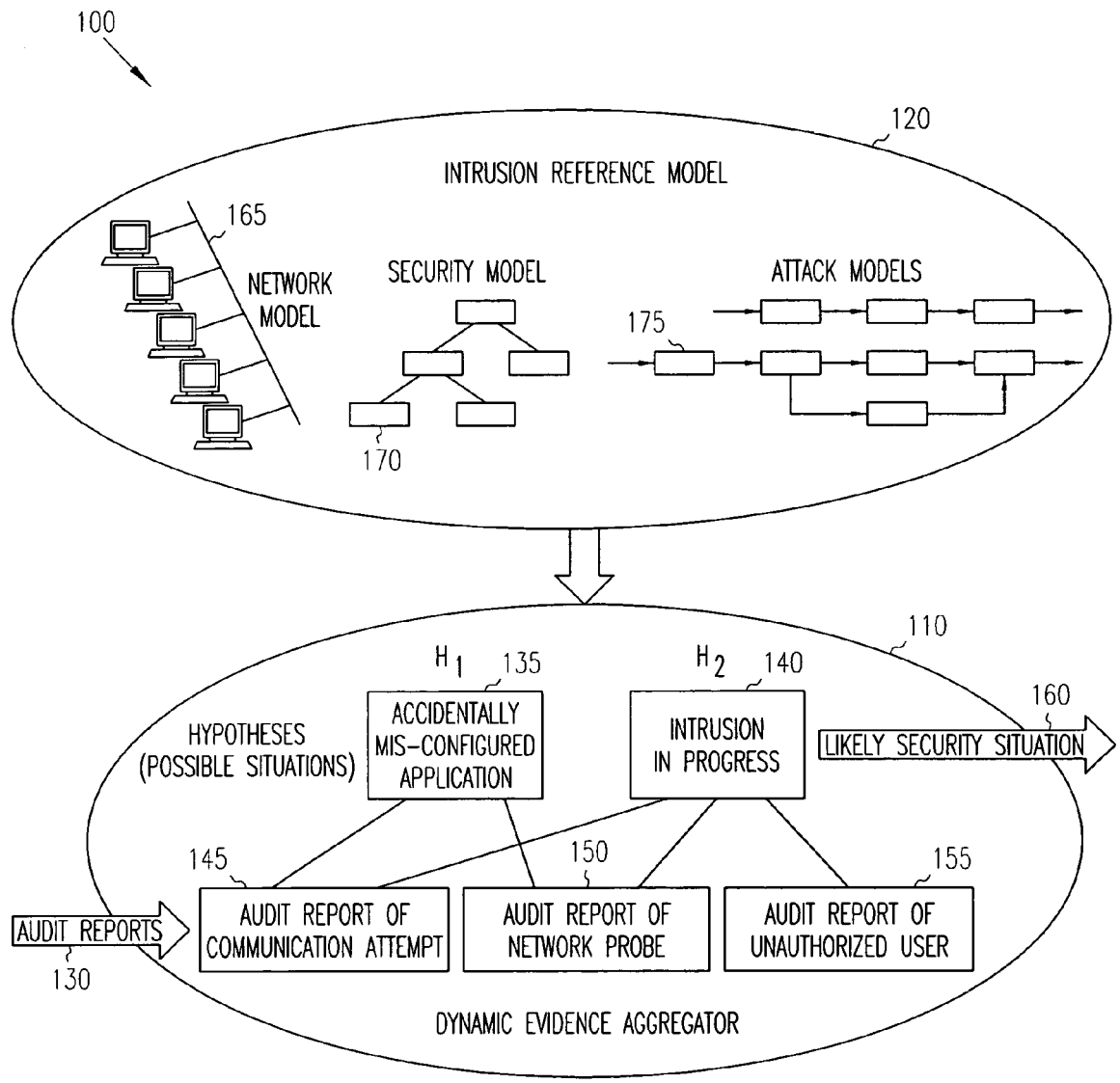
FIG. 1 is a diagram of a system implemented process that correlates and analyzes intrusion detection reports according to an example embodiment.

FIG. 1 is a diagram of the operation of a security alert management system indicated generally at 100. System 100 uses a Dynamic Evidence Aggregator (DEA) 110 to combine results from multiple intrusion detectors to reduce the false alarm rate and decrease the time required to detect an intrusion. In one embodiment, a network is monitored for intrusions. The network includes multiple devices, such as routers, switches, firewalls, servers, user computers and devices, and other devices that are coupled to the network.

In one embodiment, the system 100 includes a Bayesian estimation network and a calculus based on qualitative probability. The DEA 110 relies upon a knowledge base called the Intrusion Reference Model (IRM) 120, containing information about the protected network, its configuration, installed Intrusion Detection Systems (IDSs), and related security goals. In one embodiment, the IRM 120 is an object model using a hierarchy of objects to represent the model.

DEA 110 receives IDS reports 130 such as audit reports from a number of intrusion detection systems stationed at various points in a monitored system. System 100 retains all received IDS reports, often tens of thousands of reports per day from a moderately complex computer network, even when sensors have been "tuned" to reject clearly inappropriate alerts. While the number of alerts can always be reduced by further "tuning," a point is reached where information about hostile activity is lost.

System 100 in one embodiment uses a two-step process to help a security analyst locate serious intrusions among the thousands of reports. First, each of the incoming IDS reports is clustered with one or more explanations or hypotheses—called events, as indicated for example at 135, 140. Hypothesis H1 at 135 represents one explanation for an IDS report: an accidentally mis-configured application, and hypothesis H2 at 140 is used to represent an intrusion in progress explanation for an IDS report. Three example reports are shown. Report 145 is an audit report of a communication attempt. Report 150 is an audit report of a network probe. Report 155 is an audit report of an unauthorized user.

The second step of the process uses information in the intrusion reference model to score events in terms of plausibility (likelihood of occurrence) and impact (severity). These scores can be examined in a Graphical User Interface (GUI) to determine the likely security posture of the monitored system. Likely security situations are then provided as indicated at 160.

The detectors that provide the audit reports 130 may be any type generally available, or available in the future. Some typical detectors include anomaly detectors that look for strange entry attempts, and may key off too much traffic between two entities that normally don't talk. Such detectors are generally trained in terms of what traffic patterns are normal. Other detectors may be characterized as misuse detectors, that look for known viruses or signatures. They generally look for known artifacts, such as file names or other characteristics. The reports may be generated by examining packets of network data or from an audit of computer or device logs.

The intrusion reference model 120 comprises a network model 165 that models computers, devices, other assets, criticality of assets, what devices are used for, accounts, network addresses and other network entities, and security vulnerabilities stored in a knowledge base. A security model 170 comprises a security goal database including a hierarchy of security policies, such as protecting volumes, directories, files within directories, etc. The intrusion reference model 120 also includes various attack models 175 that are kept in a knowledge base in a probabilistic form. They represent different kinds of attacks, and the probabilities of attacks given certain attack characteristics, such as IP spoofing.

As indicated above, the intrusion reference model comprises a number of top-level schemes. Multiple lower level objects may inherit characteristics from one or more of these schemes. Examples of the schemes include but are not limited to local-thing, account, administrative-domain, citation, device, enclave, file, goal, interface, key, network-entity, ontology-information, operation, organization, person, port, privilege, process, product, protocol, report-signature, report-type, service, site, software, software-type, temporal-type, test-condition, vendor, and vulnerability.

Figure 2:
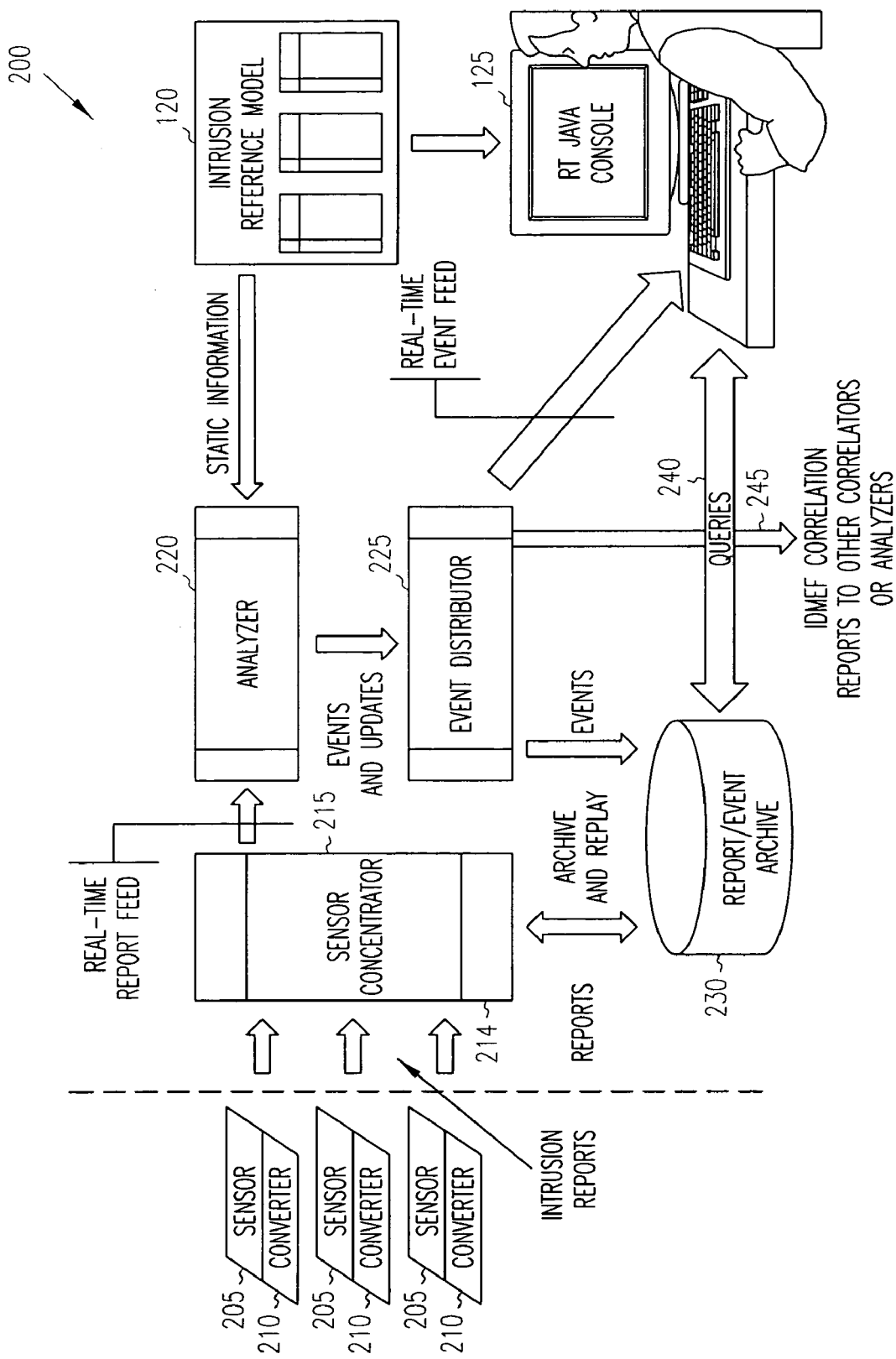
FIG. 2 is a block diagram of an architecture for the system of FIG. 1 according to an example embodiment.

FIG. 2 depicts the system 100 architecture generally at 200. A variety of third-party intrusion sensors 205 are placed throughout the protected network. A set of tailored converters 210 are distributed with the sensors to translate reports from either the native format of the sensor or the IDMEF (Intrusion Detection Message Exchange Format—a standard XML reporting format defined by the Internet Engineering Task Force) into a standard console canonical format. In further embodiments, the converters may be local to the system 100, and translate reports as they are received from the protected network or an alternative network or communication link.

The reports are then clustered with associated hypotheses or events in a sensor concentrator 215. Events may be pre-existing or may be created as needed. The resulting events are sent to an analyzer 220, which uses Bayesian quantitative probability to assign scores for event plausibility (is it likely the event occurred) and severity and provides results to an event distributor 225. Both sensor reports and related events are stored in a database 230 for later correlation and analysis and/or can provide a real-time flow of events.

Once the reports are clustered and associated with events, the event analyzer 220 weighs evidence for events that have been hypothesized. Some clusters may represent alternative hypotheses. Different scenarios, such as IDS false positive, innocuous event, intrusions, etc, may be weighed against each other using qualitative probability. The event analyzer 220 also computes the effect of intrusion events on security goals. A hierarchy of goals allows for inference up a goal tree. Further, higher levels of security goal compromise based on compromise of lower goals may be inferred.

The system 100 can be used as a stand-alone correlation and analysis system or may be embedded as part of a hierarchy of intrusion sensors and correlators. In stand-alone mode, system 100 reports and events can be viewed on a Java-based graphical console 235. An analyst at the console can view events as they are processed by the analyzer 220 in real time or can retrieve events from the database using queries 240. In the embedded mode, correlation events are transmitted to other correlation or analysis entities in IDMEF format at 245.

Prior analysis of reports stored in database 230 clustered reports by common source, destination, user name, times, and canonical attack name. The present system additionally correlates data as a function of whether it is related to another event, such as a manifestation or side effect of another event, part of a composite event, or even a specialization of one or more events. These are sometimes referred to as event to event linkages. Reports also are linked to events. A single report may support more than one event or a single event may be supported by multiple reports. When no existing event is close enough to be a plausible cause, a new event may be hypothesized.

A graphical user interface (GUI) helps an analyst rapidly review all information from a selected period and to rapidly select the most important events. Two powerful facilities are provided: a "triage" table and a set of filters.

Figure 3:
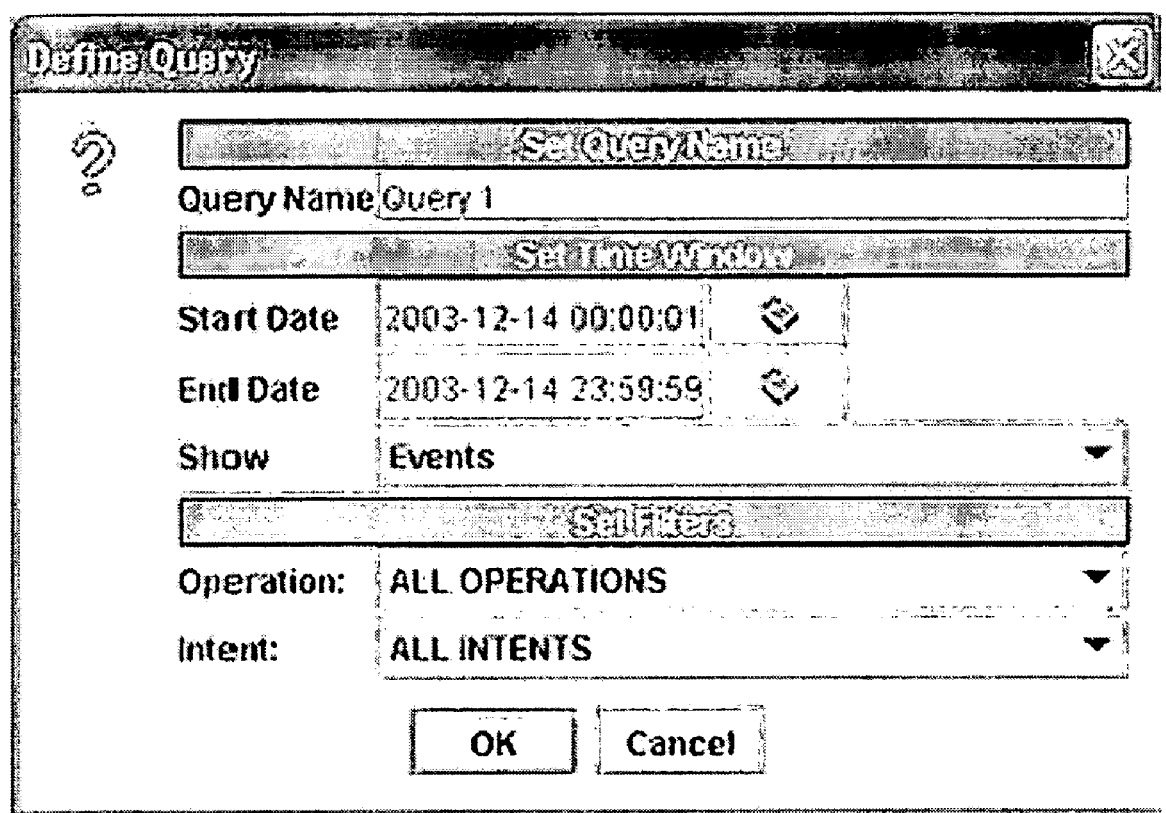
FIG. 3 is a screen shot of a query selection window of an example graphical user interface for the system of FIG. 1.
Figure 4:
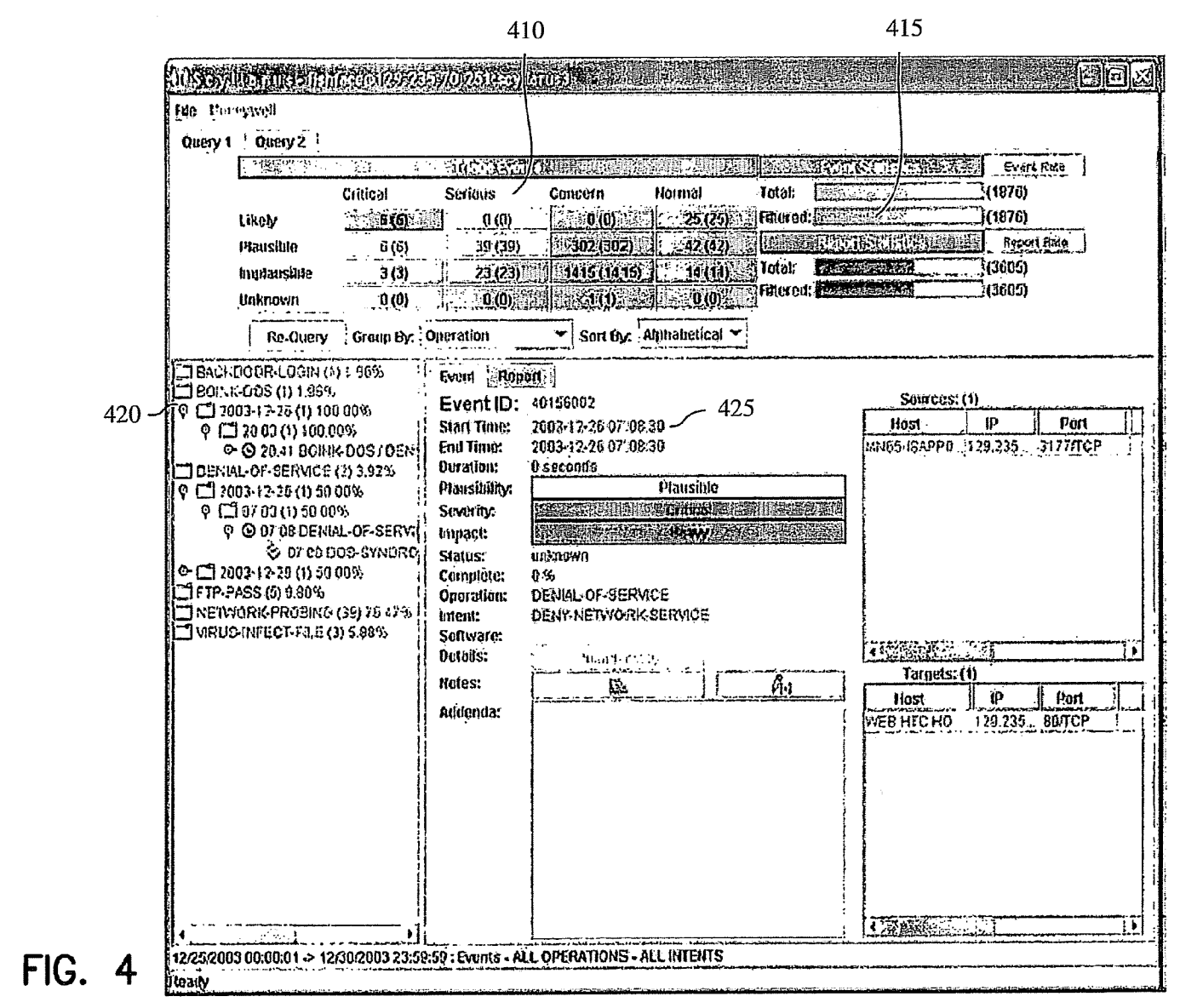

A query filter selection window depicted in FIG. 3 allows selection of the time interval to be considered, either by entering dates and times into selection windows or by selecting dates from calendars. This window also allows the analyst to select IDS reports, events, or selected subsets of events and provides access to filters that select events to be displayed As depicted in FIG. 4, the GUI provides the analyst with several information panes for rapidly reviewing all information for a selected period and rapidly selecting the most important events. At the upper left of this display, a "triage" table 410, a tableau with four rows and four columns, displays the number of events in the selected time interval at each of four levels of plausibility and severity, respectively. An analyst can click on a single cell in this table to rapidly display only events at a specific level of plausibility and severity. Conditioning the selection by holding down the control key displays only events with severity and plausibility scores equal to or greater that the selected cell. A reduction pane 415 at upper left of the display illustrates the data reduction capability by depicting the number of IDS reports and resulting events in the selected interval on a logarithmic scale. Buttons at the right side of this pane allow the analyst to display plots of either event or report arrival rate per hour to highlight peak activity times.

A list pane 420 on the left side of the display provides a scrollable list of individual event or report descriptors of all of the selected events or IDS reports. The analyst can group events in this list by start time (the default), by the operation involved (e.g discovery, denial of service, evasion), by hypothesized intent, by source or target IP address, or by source or target host. Reports can be grouped by report time, report signature, reporting IDS, source or target IP address, or source or target host. It should be noted that the actual positions of these panes may be varied in different embodiments. The list of event descriptors is sorted by time of occurrence, with subsidiary events indented below their parent.

Clicking on an individual event descriptor populates the lower right pane 425, which provides details of the selected event. Details available include the reported start time and end time of the event, the duration of the event, the adjudged levels of plausibility, severity and impact, an assessment of the vulnerability of the target to the hypothesized attack an estimate of the completeness of the attack in reaching its likely objective, the type of operation involved, and the adjudged intent of the operation. Lists of involved targets and sources (ports or hosts, where appropriate) are also provided along with links to all of the associated IDS reports.

Clicking on the icon for a report in the list pane 420, or on the Report tab in the pane 425, replaces the event pane with details of the IDS report underlying an event. as depicted in FIG. 5. If provided by the IDS, packet or user The signature of the report and, if provided by the IDS, packet or user account details are available in subsidiary windows.

Auxiliary links are provided to allow an analyst with access to the Internet to view relevant entries from vulnerability databases such as Mitre's CVE or Bugtraq, and to query domain registration databases such as ARIN, RIPE or APNIC to determine the owner of a source IP address. Another link opens a note window to permit an analyst to append notes to the event record. An analyst my use the notes window to propose different scores for plausibility and severity that can be used for future adjustments to the probabilities used by the system.

The locations and methods of interacting with these various visual constructs, such as panes, windows and links may be varied in different embodiments based on ergonomic factors or other factors as desired.

Figure 6:
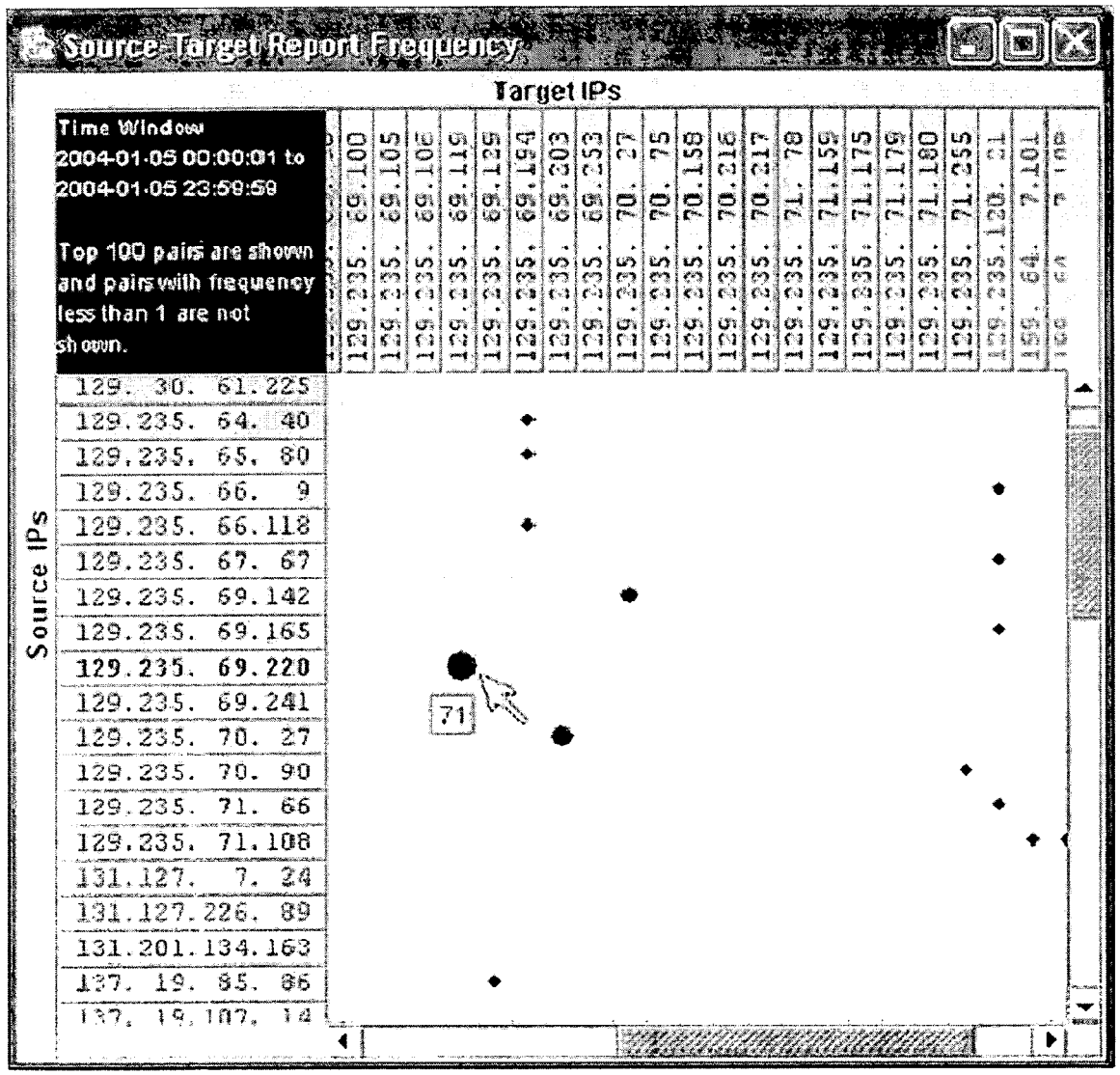
FIG. 6 is a screen shot of a display of source-target interactions produced by the system of FIG. 1.

Another subsidiary display, depicted in FIG. 6 provides the analyst with a summary of interactions between the various host and target IP addresses in the report database. The size of dots at the intersection of source IP rows and target IP columns indicate the number of reports of interactions between the source IP and target IP. As shown in FIG. 6, positioning the cursor over an intersection lists the number of reports for this combination. Clicking on the intersection selects the corresponding reports for display in the main window.

In one embodiment, system 100 uses information in the database 230. In further embodiments, the system may be used to analyze data in near real time as it flows into the system from deployed intrusion sensors.

Figure 7:
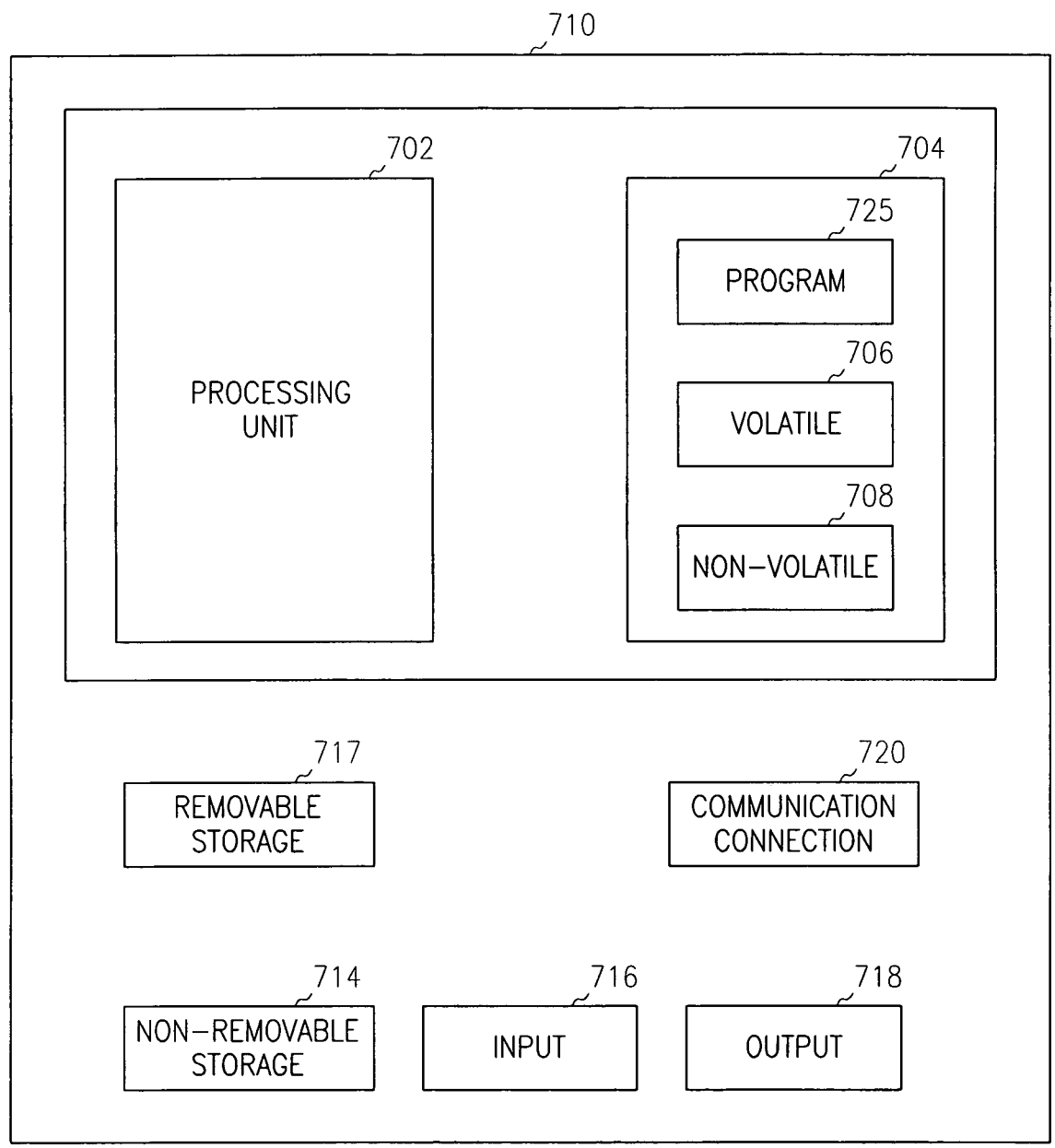
FIG. 7 is a block diagram of a computer system for performing selected processes according to an example embodiment.

A block diagram of a computer system that executes programming for performing the above algorithm is shown in FIG. 7. A general computing device in the form of a computer 710, may include a processing unit 702, memory 704, removable storage 712, and non-removable storage 714. Memory 704 may include volatile memory 706 and non-volatile memory 708. Computer 710 may include—or have access to a computing environment that includes—a variety of computer-readable media, such as volatile memory 706 and non-volatile memory 708, removable storage 712 and non-removable storage 714. Computer storage includes random access memory (RAM), read only memory (ROM), eraseable programmable read-only memory (EPROM) & electrically eraseable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 710 may include or have access to a computing environment that includes input 716, output 718, and a communication connection 720. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks. Computer-readable instructions stored on a computer-readable medium are executable by the processing unit 702 of the computer 710. A hard drive, CD-ROM, and RAM are some examples of articles including a computer-readable medium. For example, a computer program 725 capable of providing a generic technique to perform access control check for data access and/or for doing an operation on one of the servers in a component object model (COM) based system according to the teachings of the present invention may be included on a CD-ROM and loaded from the CD-ROM to a hard drive. The computer-readable instructions allow computer system 700 to provide generic access controls in a COM based computer network system having multiple users and servers.

CONCLUSION

The security alert management system processes reports from a variety of intrusion detection sensors. Thousands of reports per hour may be processed, and reduced to a smaller subset of information (events) that is more relevant, and focuses an analyst on the most probable attacks. By clustering and correlating reports from the multiple sensors, stealthy attacks are more effectively detected, and a vast reduction in false alarms and noise is obtained. The categorization of events by plausibility, severity and utility lead to a more efficient review of the events. Attacks may also be discounted on unsusceptible targets. Events and intrusion reports are retained in a database for forensic analysis.

The invention claimed is:
1. A method of correlating and analyzing reports of detected activity in a computer network, the method comprising:
  receiving and storing intrusion reports from multiple intrusion detectors, each intrusion detector operable to provide a report in a standard canonical format;
  clustering the intrusion reports with one or more explanations for associated intrusion reports in a sensor concentrator operable to assign a single intrusion report to more than one explanation, assign a plurality of intrusion reports to a single explanation, and, when no existing explanation supports a plausible cause, hypothesize a new explanation; and scoring, by a microprocessor, the events one or more explanations for the associated intrusion reports as a function of qualitative probability at an analyzer based on an intrusion reference model that contains information about a protected network, its configuration, installed intrusion detectors, and related security goals, wherein the one or more explanations for the associated intrusion reports are weighed against each other using a calculus based on qualitative probability.

2. The method of claim 1, wherein the one or more explanations for the associated intrusion reports are scored based on plausibility and impact.

3. The method of claim 2, wherein the one or more explanations for the associated intrusion reports are scored using a Bayesian estimation network.

4. The method of claim 1 and further comprising providing a viewable real time flow of the one or more explanations for the associated intrusion reports.

5. The method of claim 1 and further comprising providing a graphical user interface for allowing a user to review information for a selected period of time and select important events.

6. The method of claim 5 and further comprising providing filters in the graphical user interface for selecting events to be displayed.

7. The method of claim 5 and further comprising providing a list of the one or more explanations for the associated intrusion reports in the graphical user interface, and providing controls for grouping events by start time, operation involved, hypothesized intent, source IP address, or target host.

8. The method of claim 1, wherein the intrusion reference model further contains a plurality of network-independent attack models that represent different kinds of attacks and probabilities of attacks based on attack characteristics.

9. An intrusion detection system comprising:

means for receiving and storing intrusion reports from multiple intrusion detectors, each intrusion detector operable to translate an intrusion report into standard canonical format;

means for clustering the intrusion reports and associating them with one or more explanations for the intrusion reports based, in part, on input from the means for storing, wherein the means for clustering the intrusion reports and associating them with the one or more explanations for the intrusion reports is operable to assign a single intrusion report to more than one explanation, assign a plurality of intrusion reports to a single explanation, and, when no existing explanation supports a plausible cause, hypothesize a new explanation; and means for scoring the one or more explanations for the intrusion report at an analyzer using a calculus based on qualitative probability and based on an intrusion reference model that contains information about a protected network, its configuration, installed intrusion detectors, and related security goals.

10. The intrusion detection system of claim 9 and further comprising means for displaying a list of event descriptors sorted by time of occurrence, with subsidiary events indented below their parent.

11. The intrusion detection system of claim 10 and further comprising auxiliary links for viewing relevant entries from vulnerability databases.

12. The intrusion detection system of claim 10 and further comprising means for graphically representing the number of reports of interactions between source IP and target IP.

13. The intrusion detection system of claim 9, wherein the intrusion reference model further contains a plurality of network-independent attack models that represent different kinds of attacks and probabilities of attacks based on attack characteristics.

14. A dynamic evidence aggregator for an intrusion detection system, the dynamic evidence aggregator comprising:

an input that receives and stores intrusion reports from multiple intrusion detectors, wherein each intrusion detector comprises an intrusion sensor and an associated converter, the converter operable to translate an intrusion report into standard canonical format;

a first module that clusters the translated intrusion reports into one or more explanations for the intrusion reports, the first module being operable to assign a single intrusion report to more than one explanation, assign a plurality of intrusion reports to a single explanation, and, when no existing explanation supports a plausible cause, hypothesize a new explanation; and a second module that scores the one or more explanations for the intrusion reports as a function of qualitative probability at an analyzer based on an intrusion reference model, wherein the intrusion reference model contains information about a protected network, its configuration, installed intrusion detectors, and related security goals, and wherein the one or more explanations for the intrusion reports are weighed against each other using a calculus based on qualitative probability.

15. The dynamic evidence aggregator of claim 14, wherein the multiple intrusion detectors include at least two different types of intrusion detectors and wherein the intrusion reference model further contains a plurality of network-independent attack models that represent different kinds of attacks and probabilities of attacks based on attack characteristics.

16. An intrusion detection system comprising:

multiple converters each associated with a respective intrusion sensor, the converters operable to translate an intrusion report from the intrusion sensor into standard canonical format;

a database to store the translated intrusion reports from the multiple intrusion sensors;

a first module including a sensor concentrator that clusters the intrusion reports into one or more explanations for the intrusion reports, the first module being operable to assign a single intrusion report to more than one explanation, assign a plurality of intrusion reports to a single explanation, and, when no existing explanation supports a plausible cause, hypothesize a new explanation;

an intrusion reference model including a network model, a security model, and a plurality of attack models; and a second module including an analyzer that scores the one or more explanations for the intrusion report as a function of qualitative probability based on the intrusion reference model, wherein the one or more explanations for the intrusion report are weighed against each other using a calculus based on qualitative probability.

17. The system of claim 16 wherein the one or more explanations for the intrusion report are scored based on plausibility and impact.

18. The system of claim 17 wherein the one or more explanations for the intrusion report are scored using a Bayesian estimation network.

19. The system of claim 17 and further comprising a graphical user interface.

20. The system of claim 19 wherein the graphical user interface comprises a plurality of panes of information.

21. The system of claim 20 wherein one of the panes comprises a triage table.

22. The system of claim 21 wherein the triage table comprises numbers of events displayed in cells at multiple levels of plausibility and severity, respectively.

23. The system of claim 22 wherein each cell comprises a link to events at a specific level of plausibility and severity.

24. The system of claim 20 wherein one of the panes comprises a set of filters.

25. The intrusion detection system of claim 16, wherein the plurality of attack models comprise a plurality of network-independent attack models that represent different kinds of attacks and probabilities of attacks based on attack characteristics.

* * * * *